United States Patent
Park

(10) Patent No.: US 10,045,178 B2
(45) Date of Patent: Aug. 7, 2018

(54) APPARATUS AND METHOD FOR COMMUNICATING

(71) Applicant: Chang-Joon Park, Gyeonggi-do (KR)

(72) Inventor: Chang-Joon Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 169 days.

(21) Appl. No.: 14/984,645

(22) Filed: Dec. 30, 2015

(65) Prior Publication Data

US 2016/0262145 A1  Sep. 8, 2016

Related U.S. Application Data

(60) Provisional application No. 62/128,249, filed on Mar. 4, 2015.

(30) Foreign Application Priority Data

May 19, 2015 (KR) .......................... 10-2015-0069758

(51) Int. Cl.
*H04W 4/70* (2018.01)
*H04W 76/14* (2018.01)
(Continued)

(52) U.S. Cl.
CPC .............. *H04W 4/70* (2018.02); *H04L 25/00* (2013.01); *H04W 76/14* (2018.02); *H04W 48/16* (2013.01);
(Continued)

(58) Field of Classification Search
CPC ... H04W 4/005; H04W 76/023; H04W 88/04; H04W 76/025; H04W 48/16; H04W 88/06; H04L 25/00
See application file for complete search history.

(56) References Cited

U.S. PATENT DOCUMENTS 9,331,835 B1 * 5/2016 Lee ....................... H04W 88/06
2012/0202561 A1 8/2012 Robinett
(Continued)

OTHER PUBLICATIONS

3GPP A Global Initiative, 3rd Generation Partnership Project; Technical Specification Group Radio Access Networks; LTE Device to Device Proximity Services; User Equipment (UE) radio transmission and reception (Release 12), 3GPP TR 36.877 V1.1.0 (Feb. 2015).
(Continued)

*Primary Examiner* — Pao Sinkantarakorn
*Assistant Examiner* — Kabir Jahangir
(74) *Attorney, Agent, or Firm* — The Farrell Law Firm, P.C.

(57) ABSTRACT

An apparatus and method of operating a user equipment (UE) in a wireless communication system is provided. The apparatus includes a first communication unit comprising a transmitter configured to transmit a first signal to a base station or another UE and a first receiver configured to receive a second signal from the base station, wherein the first communication unit is connected to a first port of a switch module, a second communication unit comprising a second receiver configured to receive a third signal from the another UE and a third receiver configured to receive a fourth signal from the base station, wherein the second communication unit is connected to a second port of the switch module, and wherein the switch module is configured to perform time division duplexing (TDD) switching between the first port and the second port in a first communication mode, and wherein the switch module is connected to the first port in a second communication mode.

18 Claims, 7 Drawing Sheets

(51) Int. Cl.
  *H04L 25/00* (2006.01)
  *H04W 88/06* (2009.01)
  *H04W 76/15* (2018.01)
  *H04W 48/16* (2009.01)
  *H04W 88/04* (2009.01)

(52) U.S. Cl.
  CPC ............ *H04W 76/15* (2018.02); *H04W 88/04* (2013.01); *H04W 88/06* (2013.01)

(56) References Cited

U.S. PATENT DOCUMENTS

| | | | | |
|---|---|---|---|---|
| 2012/0243446 A1* | 9/2012 | Mueller | ............... | H04B 1/0057 370/280 |
| 2012/0264473 A1 | 10/2012 | Mujtaba et al. | | |
| 2013/0122831 A1* | 5/2013 | Desclos | ................. | H04B 1/525 455/78 |
| 2013/0148636 A1 | 6/2013 | Lum et al. | | |
| 2013/0149975 A1 | 6/2013 | Yu et al. | | |
| 2013/0163488 A1* | 6/2013 | Kwon | ..................... | H04B 1/58 370/297 |
| 2013/0230026 A1* | 9/2013 | Kwon | ................. | H04W 76/023 370/336 |
| 2013/0265912 A1 | 10/2013 | Ikonen et al. | | |
| 2014/0295775 A1* | 10/2014 | Rousu | ................... | H04B 1/006 455/73 |
| 2014/0307660 A1 | 10/2014 | Gong et al. | | |
| 2014/0321423 A1 | 10/2014 | Kalhan | | |
| 2014/0328267 A1* | 11/2014 | Ryu | ...................... | H04W 4/005 370/329 |
| 2014/0329494 A1 | 11/2014 | Zisimopoulos et al. | | |
| 2015/0003287 A1 | 1/2015 | Kalhan et al. | | |
| 2015/0016410 A1 | 1/2015 | Lee et al. | | |
| 2015/0043541 A1 | 2/2015 | Blankenship et al. | | |
| 2015/0043623 A1 | 2/2015 | Kawasaki | | |
| 2015/0049732 A1 | 2/2015 | Xue et al. | | |
| 2015/0188592 A1* | 7/2015 | Solondz | ............... | H04B 1/3888 455/501 |
| 2015/0230258 A1* | 8/2015 | Kwon | ................ | H04W 72/082 370/280 |
| 2016/0218767 A1* | 7/2016 | Li | ......................... | H04B 1/401 |

OTHER PUBLICATIONS

Qualcomm Incorporated, UE RF reference architecture for D2D, 3GPP TSG-RAN WG4 #72bis, Oct. 6-10, 2014.

\* cited by examiner

APPARATUS AND METHOD FOR COMMUNICATING

PRIORITY

The application claims priority under 35 U.S.C. § 119(e) to a U.S. Provisional Patent Application filed on Mar. 4, 2015 in the United States Patent and Trademark Office and assigned Ser. No. 62/128,249, and under 35 U.S.C. § 119(a) to a Korean Patent Application filed on May 19, 2015 in the Korean Intellectual Property Office and assigned Serial No. 10-2015-0069758, the entire contents of each of which are incorporated herein by reference.

BACKGROUND

1. Field of the Disclosure

The present disclosure relates generally to a communication apparatus and method in a wireless communication system, and more particularly, to an apparatus and a method of a user equipment (UE) for controlling device to device (D2D) communication using time division duplexing (TDD).

2. Description of the Related Art

In a wireless communication system, a UE can perform communication based on a cellular communication method. Herein, the cellular communication method indicates a communication method based on a base station. The cellular communication builds a cell of a particular radius based on the base station and reuses a frequency used in another cell far apart from the cell.

In a wireless communication system, the UE can directly communicate with a neighboring UE without traversing a base station. For example, a UE can directly communicate with a neighboring UE using D2D communication.

As such, a UE can include a communication unit for communicating with a base station and a communication unit for communicating with other UEs. A UE can also include a plurality of antennas for diversity communication.

As described above, a UE can communicate with neighboring UEs using various communication methods. To support all of the various communication methods and to facilitate the communication function of a UE, a more efficient transceiver structure is required.

SUMMARY

An aspect of the present disclosure is to provide an apparatus and a method of a UE for controlling D2D communication using TDD.

Another aspect of the present disclosure is to provide an apparatus and a method of a UE for using transmission (TX) and reception (RX) frequencies of another UE as base station uplink frequencies and separately conducting transmission and reception with the other UE.

Another aspect of the present disclosure is to provide an apparatus and a method of a UE for using D2D TX and RX frequencies that are the same as base station uplink frequencies, separating D2D TX and RX paths, and carrying out communication by TDD-controlling D2D transmission and reception when the base station TX is not available.

According to an aspect of the present disclosure, an apparatus of a UE in a wireless communication system is provided. The apparatus includes a first communication unit comprising a transmitter configured to transmit a first signal to a base station or another UE and a first receiver configured to receive a second signal from the base station, wherein the first communication unit is connected to a first port of a switch module; a second communication unit comprising a second receiver configured to receive a third signal from the another UE and a third receiver configured to receive a fourth signal from the base station, wherein the second communication unit is connected to a second port of the switch module; and wherein the switch module is configured to perform time division duplexing (TDD) switching between the first port and the second port in a first communication mode, and wherein the switch module is connected to the first port in a second communication mode.

According to another aspect of the present disclosure, a method of operating a UE in a wireless communication system is provided. The method includes transmitting and receiving signals, in a second communication mode, to and from a base station through a first communication unit including a transmitter which transmits a first signal to the base station or another UE and a first receiver which receives a second signal from the base station; and transmitting a signal, in a first communication mode, to the another UE through the first communication unit or receiving a signal from the another UE through a second communication unit including a second receiver which receives a third signal from the another UE and a third receiver which receives a fourth signal from the base station.

According to another aspect of the present disclosure, a transceiver chip set is provided. The transceiver chip set includes a chip set configured to transmit and receive signals, in a second communication mode, to and from a base station through a first communication unit including a transmitter which transmits a first signal to the base station or another UE and a first receiver which receives a second signal from the base station; and transmit a signal, in a first communication mode, to the another UE through the first communication unit or receive a signal from the another UE through a second communication unit including a second receiver which receives a third signal from the another UE and a third receiver which receives a fourth signal from the base station.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
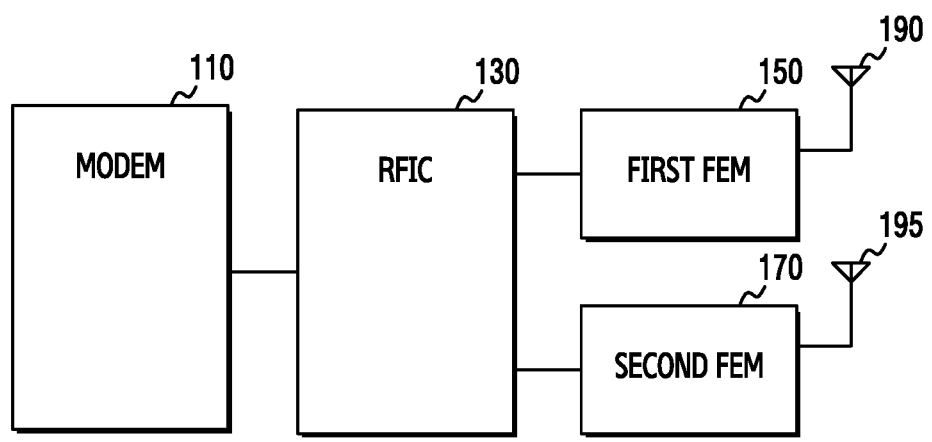
FIG. 1 is a block diagram of a UE in a wireless communication system according to an embodiment of the present disclosure.

The following detailed description with reference to the accompanying drawings is provided to assist in a comprehensive understanding of embodiments of the present disclosure as defined by the appended claims and their equivalents. It includes certain details to assist in that understanding but these are to be regarded as merely exemplary. Accordingly, those of ordinary skill in the art will recognize that various changes and modifications of the embodiments of the present disclosure described herein can be made without departing from the scope and spirit of the present disclosure. In addition, detailed descriptions of well-known functions and constructions are omitted for clarity and conciseness. Throughout the drawings, like reference numerals will be understood to refer to like parts, components and structures.

As used in the present disclosure, terms such as "includes" or "may include" refer to the presence of the corresponding function, operation or feature, and do not limit the presence of additional functions, operations or features. Also, terms such as "includes" or "has" refer to the presence of characteristics, numbers, steps, operations, components or combinations thereof, and are not intended to exclude one or more additional characteristics, numbers, steps, operations, components or combinations thereof.

As used in the present disclosure, the term "or" is used to include any and all combination of terms listed. For examples, "A or B" includes only A, only B, or both A and B.

As used in the present disclosure, terms such as "first" or "second" may be used to describe various features, but do not limit such features. For example, the terms do not limit the order and/or the importance of their associated features. Such terms may be used to differentiate one feature from another. For example, a first user equipment (alternatively, "UE") and a second user equipment are both user equipment, but are different user equipment. For example, without departing from the scope of the present disclosure, a first component may be referred to as a second component, and likewise, a second component may be referred to as a first component.

If a component is said to be "connected with" or "connected to" another component, the component may be directly connected with, or connected to, the other component, or another component may exist in between. In contrast, if a component is said to be "directly connected with" or "directly connected to" another component, it should be understood that no component exists in between.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined otherwise, all terms used herein have the same meanings as commonly understood by those of skill in the art. Such terms as those defined in a generally used dictionary are to be interpreted to have the same meanings as the contextual meanings in the relevant field of art, and are not to be interpreted to have ideal or excessively formal meanings unless clearly defined in the present disclosure.

An embodiment of the present disclosure provides a device communication apparatus and method.

FIG. 1 is a block diagram of a UE in a wireless communication system according to an embodiment of the present disclosure.

Referring to FIG. 1, the UE can include a modulator/demodulator (MODEM) 110, a radio frequency integrated circuit (RFIC) 130, a first front-end module (FEM) 150, and a second FEM 170. Herein, the MODEM 110 can be electrically connected to the RFIC 130, and the RFIC 130 can be electrically connected to the first FEM 150 and the second FEM 170. Hereinafter, terms such as "unit," "module," etc. should each be understood as a unit which processes at least one function or operation and may be embodied by hardware, by software, or by a combination of hardware and software.

The MODEM 110 can convert a baseband signal and a bit stream according to a physical layer standard of the system. For example, for data transmission, the MODEM 110 can generate complex symbols by encoding and modulating a transmit bit stream. For data reception, the MODEM 110 can restore a received bit stream by demodulating and decoding the baseband signal fed from the RFIC 130. For example, the MODEM 110 can modulate a transmit signal using a preset modulation scheme (e.g., channel encoding, modulation (e.g., orthogonal frequency division multiple access (OFDMA), code division multiple access (CDMA), time division (TD)-CDMA), phase and/or amplitude modulation (e.g., quadrature phase shift keying (QPSK), 16 quadrature amplitude modulation (16 QAM), and 64 QAM)), and output the modulated signal to the RFIC 130. The MODEM 110 can demodulate and output a signal received over an antenna using a demodulation scheme corresponding to the modulation scheme.

The RFIC 130 can transmit and/or receive signals over a radio channel through signal band conversion and amplification. That is, the RFIC 130 can up-convert a baseband signal fed from the MODEM 110 into an RF signal, transmit the RF signal over an antenna, and down-convert the RF signal received over the antenna into a baseband signal. For example, the RFIC 130 can include a transmit filter, a receive filter, an amplifier, a mixer, an oscillator, a digital to analog converter (DAC), and an analog to digital converter (ADC).

The first FEM 150 and the second FEM 170 can each output a transmit signal through a corresponding first antenna 190 and second antenna 195, respectively, as illustrated in FIG. 1, using TDD and/or frequency division duplexing (FDD), and switch TX and RX paths so as to process a signal received via the first antenna 190 and the second antenna 195, respectively. The first FEM 150 or the second FEM 170 can include an antenna switch module (ASM) and/or band filters. The first antenna 190 can serve as a primary antenna, and the second antenna 195 can serve as a diversity antenna.

The first FEM 150 or the second FEM 170 can include an ASM, a surface acoustic wave (SAW) filter, and an RF switch. The SAW filter is a band pass filter which passes a narrow bandwidth, the ASM can switch TX and RX signals, and the RF switch can switch a radio signal of various bands.

The operations of the RFIC 130, the first FEM 150, and the second FEM 170 are described below with reference to FIG. 2.

Figure 2:
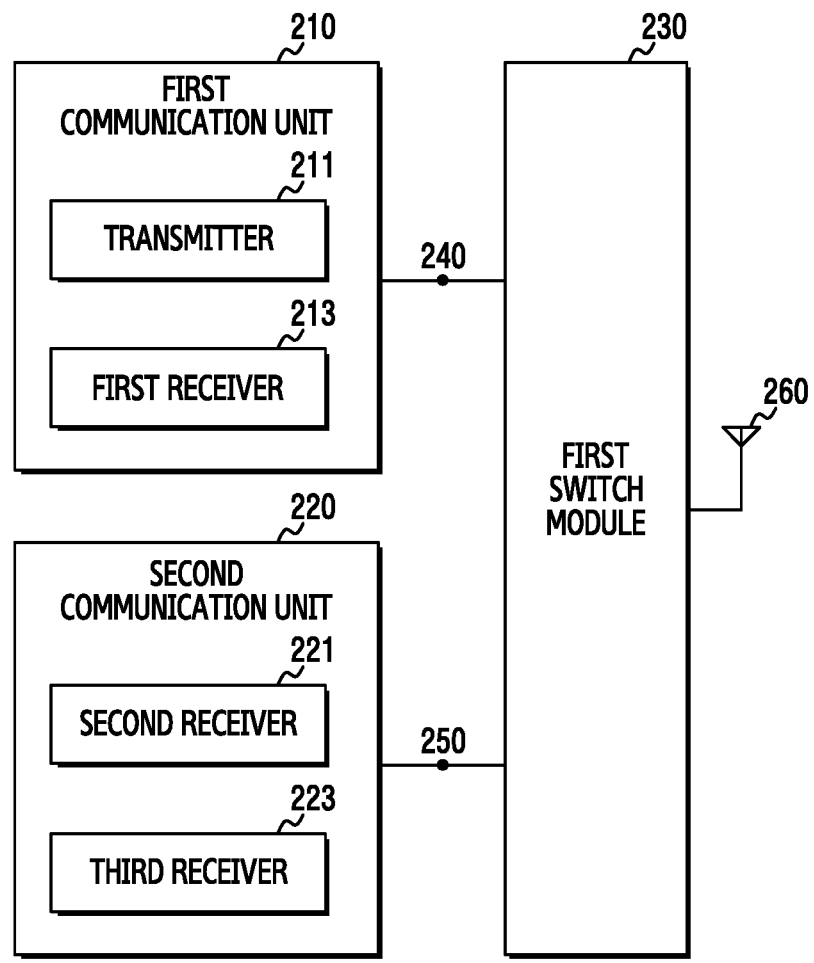
FIG. 2 is a block diagram of a wireless communication unit of a UE in a wireless communication system according to an embodiment of the present disclosure.

FIG. 2 is a block diagram of a wireless communication unit of a UE in a wireless communication system according to an embodiment of the present disclosure, which can correspond to the RFIC 130 and the first FEM 150 of FIG. 1.

Referring to FIG. 2, the UE can include a first communication unit 210, a second communication unit 220, and a first switch module 230. The first communication unit 210 can include a transmitter 211 and a first receiver 213, and the second communication unit 220 can include a second receiver 221 and a third receiver 223. In this case, the first switch module 230 can be included in the first FEM 150 of FIG. 1, and the first communication unit 210 and the second communication unit 220 can be included in the RFIC 130 or the first FEM 150 of FIG. 1.

The UE can communicate in a base station communication mode or a device communication mode. The base station communication mode indicates the communication is based on a base station. Herein, the base station communication mode can indicate a cellular communication mode. The device communication mode indicates a direct communication with a neighboring UE without traversing a base station. Herein, the device communication mode can indicate a D2D communication mode. Hereafter, a base station communication is referred to as cellular communication, and a device communication is referred to as a D2D communication. TX and RX frequencies of the D2D communication can use the same frequencies as uplink (UL) frequencies of a cellular communication.

More specifically, the transmitter 211 in the first communication unit 210 can transmit a wide area network (WAN) TX signal to a base station or to another UE. That is, when the UE is in base station communication mode (e.g. second communication mode), the transmitter 211 can transmit the WAN TX signal to the base station. When the UE is in device communication mode (e.g. first communication mode), the transmitter 211 can transmit a D2D WAN TX signal to another UE. The WAN TX and D2D TX signals can be first signals. The first receiver 213 of the first communication unit 210 can receive a WAN RX signal from the base station. In other words, when the UE is in base station communication mode, the first receiver 213 can receive the WAN RX signal from the base station. The WAN RX signal can be a second signal.

The second receiver 221 of the second communication unit 220 can receive a D2D RX signal from the other UE. In other words, when the UE operates in device communication mode, the second receiver 221 can receive the D2D RX signal from another UE. The D2D RX signal can be a third signal. The third receiver 223 of the second communication unit 220 can receive a WAN RX signal from the base station. In other words, when the UE operates in the base station communication mode, the third receiver 223 can receive the WAN RX signal from the base station. The WAN RX signal can be the second signal.

Referring to FIG. 2, the first communication unit 210 can be functionally connected to a first port 240, and the second communication unit 220 can be functionally connected to a second port 250. Herein, the functional connection can include any direct or indirect connections. The first switch module 230 can be connected to the first port 240 and the second port 250 respectively, and a common port can be connected to an antenna 260. The first switch module 230 can be switched by a controller of the UE in device communication mode and connected to the second port 240 in base station communication mode. That is, in device communication mode, the first switch module 230 can transmit and receive the D2D TX and RX signals by TDD-switching between the first port 240 and the second port 250 according to a TDD signal. In base station communication mode, the first switch module 230 can be connected to the first port 240 by the controller of the UE and the first communication unit 210 can transmit and receive TX and RX signals to and from the base station through FDD.

Namely, when the UE is in base station communication mode for the communication, the first switch module 230 can be connected to the first port 240. Accordingly, the UE can communicate with a base station through the first communication unit 210. More specifically, the transmitter 211 of the first communication unit 210 can transmit a first signal (e.g. WAN TX signal) to a base station over an UL channel, and the first receiver 213 can receive a second signal (e.g. WAN RX signal) from a base station over a downlink (DL) channel.

When the UE is in device communication mode for the communication, the first switch module 230 can TDD-switch between the first port 240 and the second port 250. That is, in device communication mode, when the UE transmits a signal to another UE, the first switch module 230 can be connected to the first port 240. In device communication mode, when the UE receives a signal from another UE, the first switch module 230 can be connected to the second port 250. When the first switch module 230 is connected to the first port 240, the transmitter 211 of the first communication unit 210 can transmit a first signal (e.g. D2D TX signal) to another UE. When the first switch module 230 is connected to the second port 250, the second receiver 221 of the second communication unit 220 can receive a third signal (e.g. D2D RX signal) from another UE. As such, the UE separates the TX path and the RX path for D2D communication, and thus can carry out the communication without the influence of D2D communication on cellular communication. That is, the UE separates the TX path and the RX path of D2D communication and does not use a switch at a back end of the TX path, thus preventing TX performance degradation of cellular communication.

The operations of the first communication unit 210, the second communication unit 220, and the first switch module 230 are described below with reference to FIG. 3.

Figure 3:
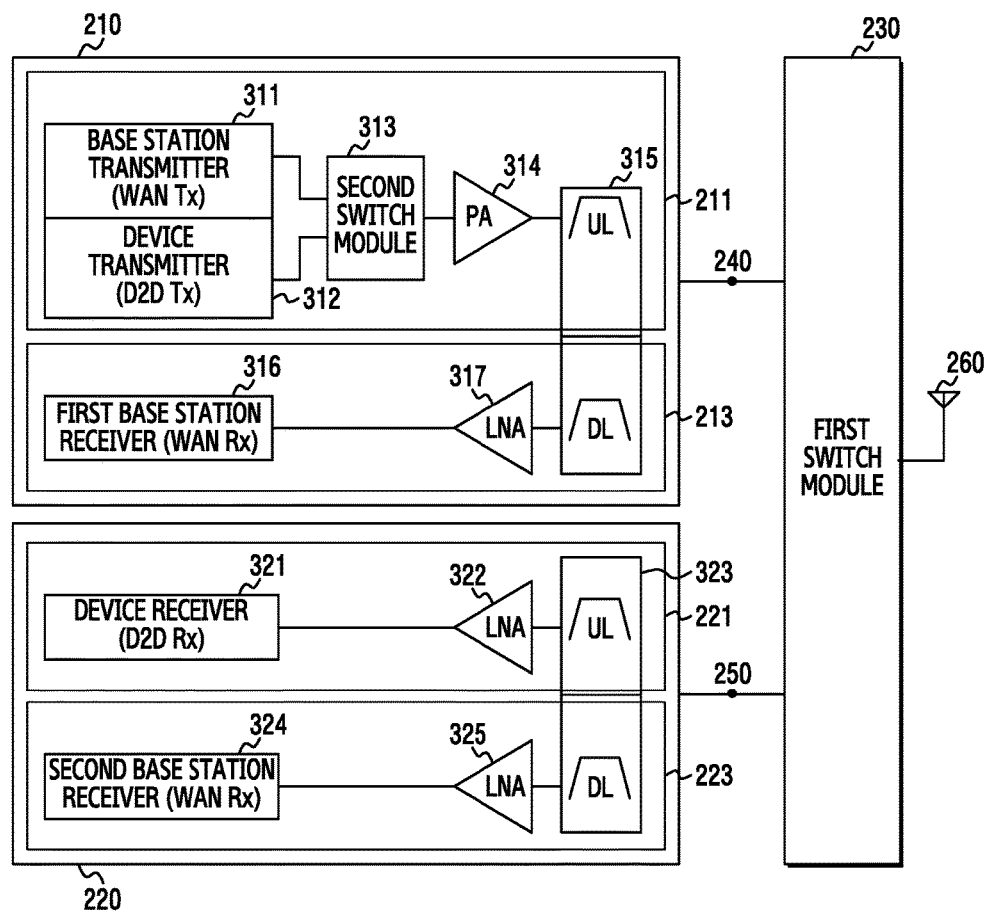
FIG. 3 is a block diagram of a UE in a wireless communication system according to an embodiment of the present disclosure.

FIG. 3 is a block diagram of a UE in a wireless communication system according to an embodiment of the present disclosure.

Referring to FIG. 3, the UE can include a first communication unit 210, a second communication unit 220, and a first switch module 230. The first communication unit 210 can include a first transmitter 211 and a first receiver 213, and the second communication unit 220 can include a second receiver 221 and a third receiver 223. In this case, the first switch module 230 of FIG. 3 can be included in the first FEM 150 of FIG. 1, and the first communication unit 210 and the second communication unit 220 of FIG. 3 can be included in the RFIC 130 or the first FEM 150 of FIG. 1.

The transmitter 211 in FIG. 3 can include a base station transmitter 311, a device transmitter 312, a second switch module 313, a power amplifier (PA) 314, a bandpass filter (BPF) 315. The first receiver 213 can include a first base station receiver 316, a low-noise amplifier (LNA) 317, and the BPF 315. The second receiver 221 can include a device receiver 321, an LNA 322, and a BPF 323. The third receiver 223 can include a second base station receiver 324, an LNA 325, and the BPF 323. The BPFs 315 and 323 can employ a duplex filter. The BPF 315 can employ a BPF which filters and passes frequencies of an UL band and a DL band of cellular communication. Herein, the base station transmitter 311 can be referred to as a cellular transmitter, the device transmitter 312 can be referred to as a D2D transmitter, the first base station receiver 316 can be referred to as a first cellular receiver, the device receiver 321 can be referred to as a D2D receiver 321, the second base station receiver 324 can be referred to as a second cellular receiver.

The PA 314 amplifies power of an input signal. The LNAs 317, 322, and 325 amplify a weak signal received at an antenna. The BPFs 315 and 323 are connected to the antenna and separate a TX frequency and an RX frequency. The BPFs 315 and 323 can include BPFs for passing frequencies in a certain band. The BPFs 315 and 323 can include a BPF for passing a certain frequency band corresponding to an UL resource and a BPF for passing a certain frequency band corresponding to a DL resource.

The second switch module 313 of the first communication unit 210 can be connected to an output stage of the base station transmitter 311 or the device transmitter 312. The second switch module 313 can select the output of the base station transmitter 311 in base station communication mode and select the output of the device transmitter 312 in D2D communication mode under control of the UE. Since the D2D communication frequency is the same as the UL frequency of base station communication, the base station transmitter 311 or the device transmitter 312 is selected according to the communication mode. That is, when the UE is in base station communication mode for a communication, the second switch module 313 can be connected to the base station transmitter 311. When the UE is in device communication mode for a communication, the second switch module 313 can be connected to the device transmitter 312. The second switch module 313 can be omitted when a controller of the UE controls the base station transmitter 311 or the device transmitter 312 according to the communication mode.

When the UE is in base station communication mode for a communication, the first switch module 230 can be connected to a first port 240. Accordingly, the UE can communicate with a base station through the first communication unit 210. More specifically, the second switch module 313 can be connected to the base station transmitter 311. An output signal from the base station transmitter 311 can pass through the PA 314 and the BPF 315 which passes a certain frequency band corresponding to the UL resource of the BPF 315, and be transmitted to a base station. The signal received from a base station can pass through the BPF 315 which passes a certain frequency band corresponding to the DL resource of the BPF 315 and the LNA 317, and be output to the first base station receiver 316.

When the UE is in device communication mode for a communication, the first switch module 230 can TDD-switch between the first port 240 and the second port 250. That is, in device communication mode, when the UE transmits a signal to another UE, the first switch module 230 can be connected to the first port 240. In device communication mode, when the UE receives a signal from another UE, the first switch module 230 can be connected to the second port 250.

When the UE is in device communication mode for a communication and the first switch module 230 is connected to the first port 240, the second switch module 313 can be connected to the device transmitter 312 for signal transmission in device communication mode. The second switch module 313 may be connected to the device transmitter 312 only under the condition that the UE does not enter base station communication mode, that is, that the UE does not perform cellular communication. In this case, the output signal from the device transmitter 312 can pass through the PA 314 and the BPF 315 which passes a certain frequency band corresponding to the UL resource of the BPF 315, and be transmitted to another UE.

In this case, although the UL resource is used for device communication mode, the DL resource can still be used for base station communication mode. Namely, a signal received from a base station can pass through the BPF 315 which passes a certain frequency band corresponding to the DL resource of the BPF 315 and the LNA 317 and then be output to the first base station receiver 316.

When the UE is in device communication mode for a communication and the first switch module 230 is connected to the second port 250, the second receiver 221 of the second communication unit 220 can receive a signal from another UE. Namely, a signal received from another UE can pass through the BPF 323 which passes a certain frequency band corresponding to the UL resource of the BPF 323 and the LNA 322 and then be output to the device receiver 321.

In this case, although the UL resource is used for device communication mode, the DL resource can still be used for base station communication mode. Namely, a signal received from a base station can pass through the BPF 323 which passes a certain frequency band corresponding to the DL resource of the BPF 323 and the LNA 325 and then be output to the second base station receiver 324.

Figure 4:
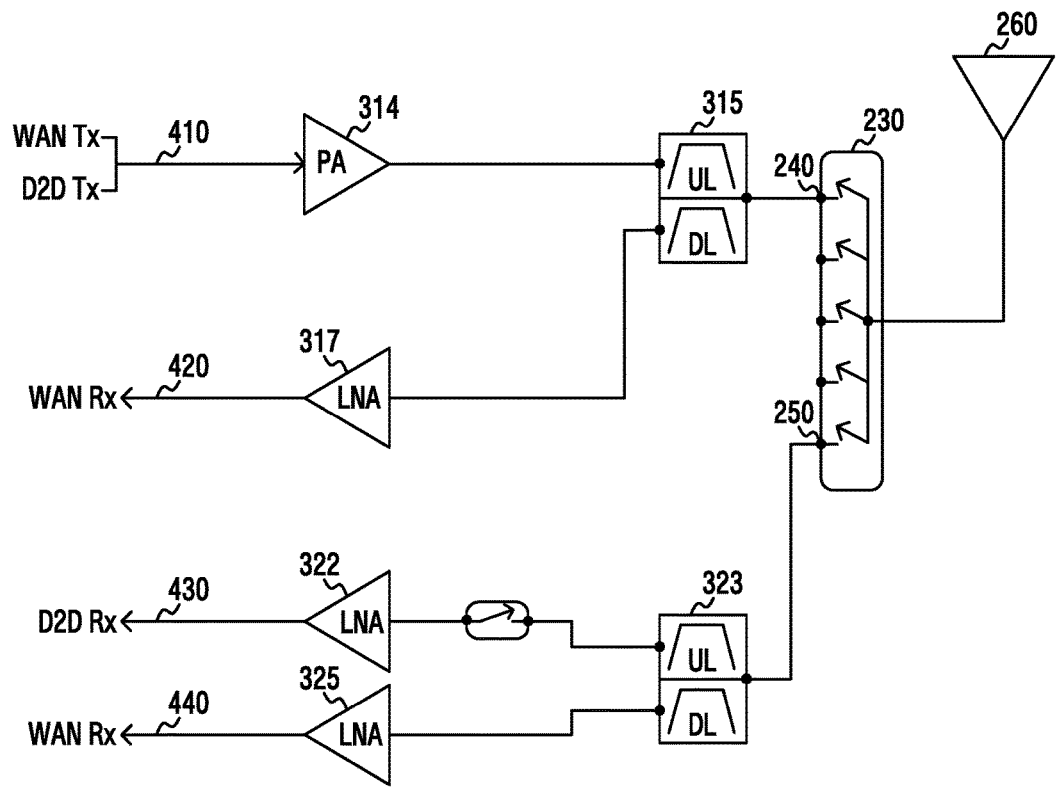
FIG. 4 is a block diagram of a UE in a wireless communication system according to an embodiment of the present disclosure.

FIG. 4 is a block diagram of a UE in a wireless communication system according to an embodiment of the present disclosure.

Referring to FIG. 4, the UE can include a first switch module 230, a PA 314, a first BPF 315, and a second BPF 323, a first LNA 317, a second LNA 322, and a third LNA 325. The PA 314 and the first BPF 315 can be included in the transmitter 211 of FIG. 2, the first LNA 317 and the first BPF 315 can be included in the first receiver 213 of FIG. 2, the second LNA 322 and the second BPF 323 can be included in the second receiver 221 of FIG. 2, and the third LNA 325 and the second BPF 323 can be included in the third receiver 223 of FIG. 2.

The UE can include four paths for sending and receiving signals to and from a base station or another UE. That is, the UE can include a TX path 410, a first cellular RX path 420, a D2D RX path 430, and a second cellular RX path 440.

The first BPF 315 and the second BPF 323 can employ a duplex filter. The first BPF 315 can employ a BPF which filters and passes frequencies of a UL band and a DL band of a cellular communication. The first BPF 315 can filter a TX signal or a D2D TX signal of a cellular communication with a UL band filter and send the filtered signal to the port 240 of the first switch module 230. The BPF 315 can filter an RX signal of a cellular communication received through the port 240 with a DL band filter and send the filtered signal to the first base station transmitter 316. The second BPF 323 can filter a D2D RX signal received through the port 250 of the first switch module 230 with a UL band filter and send the filtered signal to the device receiver 321. The second BPF 323 can filter an RX signal of a cellular communication received through the port 250 of the first switch module 230 with a DL band filter and send the filtered signal to the second base station receiver 324.

When the UE is in base station communication mode, the first switch module 230 can be connected to the first port 240. Hence, the UE can communicate with a base station through the TX path 410 or the first cellular RX path 420. More specifically, the WAN TX signal output from the PA 314 in the TX path 410 can pass through the UL BPF of the first BPF 315 and be transmitted to a base station. The WAN RX signal received from a base station can pass through the DL BPF of the first BPF 315 and be output to the base station receiver (e.g. the first base station received 316 of FIG. 3) through the first LNA 317 and the path 420.

In device communication mode for communicating with another UE, the first switch module 230 can TDD-switch between the first port 240 and the second port 250 under control of a device controller. That is, in device communication mode, when the UE transmits a signal to another UE, the first switch module 230 can be connected to the first port 240. When the UE receives a signal from another UE, the first switch module 230 can be connected to the second port 250.

In the TX period of device communication mode, the first switch module 230 is connected to the first port 240, and the UE can transmit the D2D TX signal to the other UE in the TX path 410. That is, the D2D TX signal output from the PA 314 in the TX path 410 can be applied to the port 240 of the first switch module 230 through the UL BPF of the first BPF 315 and transmitted to another UE via the first switch module 230 and the antenna. In this case, although the UL resource is used for device communication mode, the DL resource can still be used for base station communication mode. In other words, the WAN RX signal received from a base station can be applied to the base station receiver (e.g. the first base station receiver 316 of FIG. 3) via the DL BPF of the first BPF 315, the first LNA 317, and the first cellular RX path 420.

In the RX period of device communication mode, the first switch module 230 can be connected to the second port 250 and send the D2D RX signal received over the antenna to the second BPF 323. The D2D RX signal can use the UL band frequencies. Hence, the D2D RX signal can pass through the UL BPF of the second BPF 323 and be output to the device receiver (e.g. device receiver 321 of FIG. 3) through the second LNA 322 and the path 430. In this case, although the UL resource is used for device communication mode, the DL resource can still be used for the base station communication mode. In other words, a signal received from a base station can be forwarded to the base station receiver via the DL BPF of the second BPF 323, the third LNA 325, and the second cellular RX path 440.

The D2D TX and the D2D RX can be activated when the TX of a cellular communication is not conducted. That is, the D2D TX and the D2D RX can be performed when the TX of a cellular communication is not conducted. When a cellular communication TX is required during the D2D TX and the D2D RX, the controller of the UE can terminate or drop a D2D communication.

Figure 5:
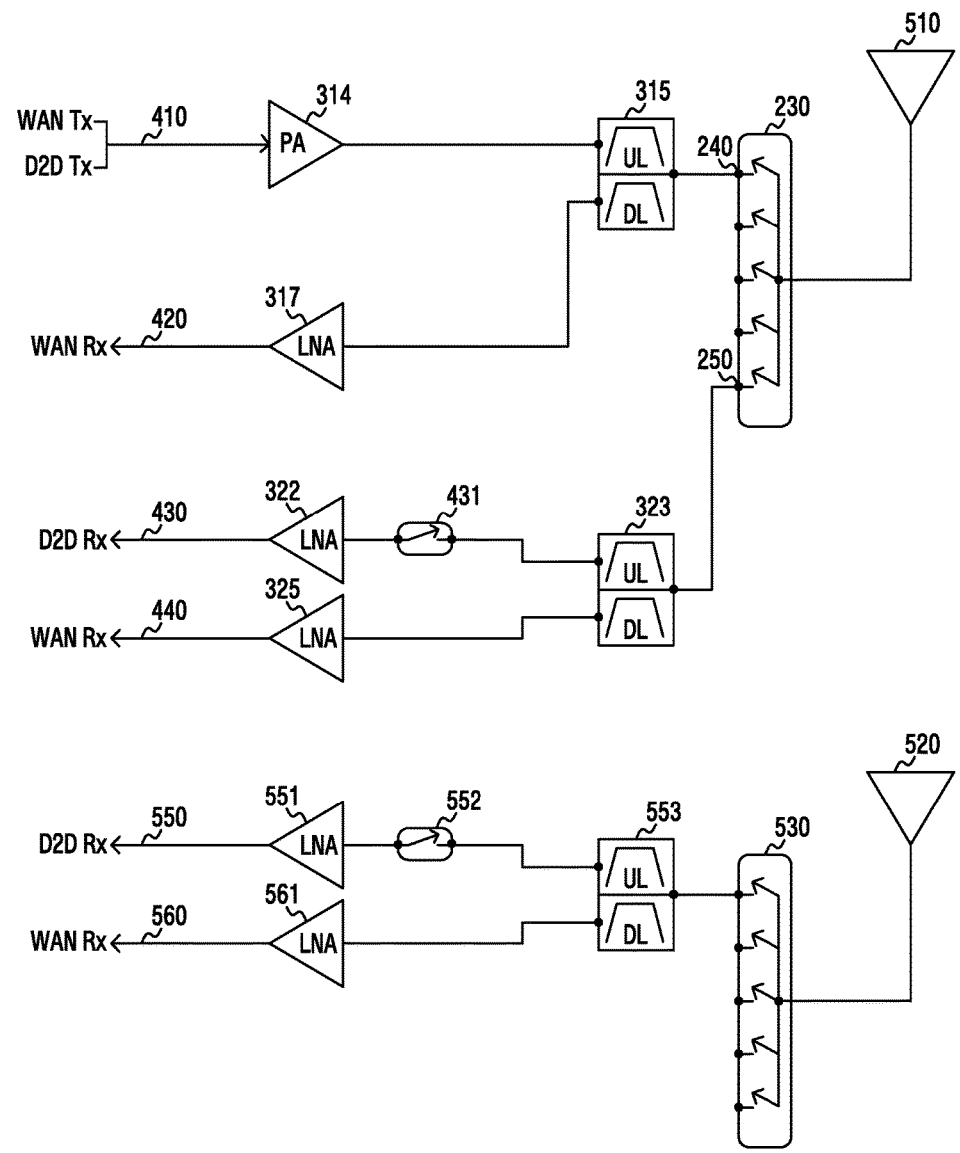
FIG. 5 is a block diagram of a UE in a wireless communication system according to an embodiment of the present disclosure.

FIG. 5 is a block diagram of a UE in a wireless communication system according to an embodiment of the present disclosure.

Referring to FIG. 5, the UE can transmit or receive a signal using two or more antennas. For example, when a base station downlinks a signal using TX diversity, the UE must receive a DL signal using RX diversity. In FIG. 5, a base station performs TX diversity and the UE performs RX diversity. In FIG. 5, a first antenna 510 can serve as a primary antenna and a second antenna 520 can serve as a diversity antenna.

A transceiver structure connected to the first antenna 510 can include a first switch module 230, a PA 314, a first BPF 315, a second BPF 323, a first LNA 317, a second LNA 322, and a third LNA 325. The PA 314 and the first BPF 315 can be included in the transmitter 211 of FIG. 2, the first LNA 317 and the first BPF 315 can be included in the first receiver 213 of FIG. 2, the second LNA 322 and the second BPF 323 can be included in the second receiver 221 of FIG. 2, and the third LNA 325 and the second BPF 323 can be included in the third receiver 223 of FIG. 2. The transceiver structure connected to the first antenna 510 of FIG. 5 is substantially identical to the transceiver structure of the UE of FIG. 4.

The transceiver structure connected to the second antenna 520 can include a third switch module 530, a third BPF 553, a fourth LNA 551, and a fifth LNA 561. In this case, the transceiver structure connected to the second antenna 520 can be included in the RFIC 130 or the second FEM 170 FIG. 1.

The UE can include six paths for sending or receiving signals to or from the base station or the other UE. That is, the UE can include a TX path 410, a first cellular RX path 420, and a first D2D RX path 430, and a second cellular RX path 440 which are connected to the first antennae 510, and a second D2D RX path 550 and a third cellular RX path 560 which are connected to the second antenna 520.

The UE can transmit and receive signals over the first antenna 510.

When the UE is in base station communication mode, the first switch module 230 can be connected to a first port 240. Hence, the UE can communicate with a base station through the TX path 410 or the first cellular RX path 420 connected to the first antenna 510. More specifically, the signal output from the PA 314 in the TX path 410 can pass through a BPF which passes a certain frequency band corresponding to the UL resource of the first BPF 315 and be transmitted to a base station. A signal received from a base station can pass through a BPF which passes a certain frequency band corresponding to the DL resource of the first BPF 315 and be output to the first LNA 317 through the first cellular RX path 420.

When the UE is in device communication mode for a communication, the first switch module 230 can TDD-switch between the first port 240 and a second port 250. That is, in device communication mode, when the UE transmits a signal to another UE, the first switch module 230 can be connected to the first port 240. In device communication mode, when the UE receives a signal from another UE, the first switch module 230 can be connected to the second port 250.

When the UE is in device communication mode for a communication and the first switch module 230 is connected to the first port 240, the UE can transmit a signal to another UE through the TX path 410 connected to the first antenna 510. Device communication mode can be performed only under the condition that the UE does not operate in base station communication mode, that is, that the UE does not conduct cellular communication. More specifically, the output signal from the PA 314 in the TX path 410 can pass through the BPF which passes a certain frequency band corresponding to the UL resource of the first BPF 315 and be transmitted to another UE.

In this case, although the UL resource is used for device communication mode, the DL resource can still be used for base station communication mode. Namely, a signal received from a base station can pass through the BPF which passes a certain frequency band corresponding to the DL resource of the first BPF 315 and then be output to the first LNA 317 through the first cellular RX path 420 connected to the first antenna 510.

When the UE is in device communication mode for a communication and the first switch module 230 is connected to the second port 250, the UE can receive a signal from another UE through the first D2D RX path 430 connected to the first antenna 510. The signal received from another UE can pass through the BPF which passes a certain frequency band corresponding to the UL resource of the second BPF 323 and be output to the second LNA 322 through the first D2D RX path 430. A first switch 431 connects the second LNA 322 with the second BPF 323. For example, the first switch 431 does not connect the second LNA 322 with the second BPF 323 while the UE uses UL resource for WAN Tx or D2D Tx communication through the TX path 410 and the first switch 431 connects the second LNA 322 with the second BPF 323 for D2D Rx communication.

In this case, although the UL resource is used for device communication mode, the DL resource can still be used for base station communication mode. Namely, a signal received from a base station can pass through the BPF which passes a certain frequency band corresponding to the DL resource of the second BPF 323 and then be output to the third LNA 325 through the second cellular RX path 440 connected to the first antenna 510.

The UE can transmit and receive signals over the first antenna 510 and concurrently receive signals over the second antenna 520.

That is, the UE can receive a signal from another UE in the second D2D RX path 550 connected to the second antenna 520. In other words, the signal received from another UE can pass through the BPF which passes a certain frequency band corresponding to the UL resource of the third BPF 553 and then be output to the fourth LNA 551 through the second D2D RX path 550. A second switch 552 connects the fourth LNA 551 with the third BPF 553. For example, the second switch 552 does not connect the fourth LNA 551 with the third BPF 553 while the UE uses UL resource for WAN Tx or D2D Tx communication and the second switch 552 connects the fourth LNA 551 with the third BPF 553 for D2D Rx communication.

In this case, although the UL resource is used for device communication mode, the DL resource can still be used for base station communication mode. Namely, a signal received from a base station can pass through the BPF which passes a certain frequency band corresponding to the DL resource of the third BPF 553 and then be output to the fifth LNA 561 through the third cellular RX path 560 connected to the second antenna 520.

Figure 6:
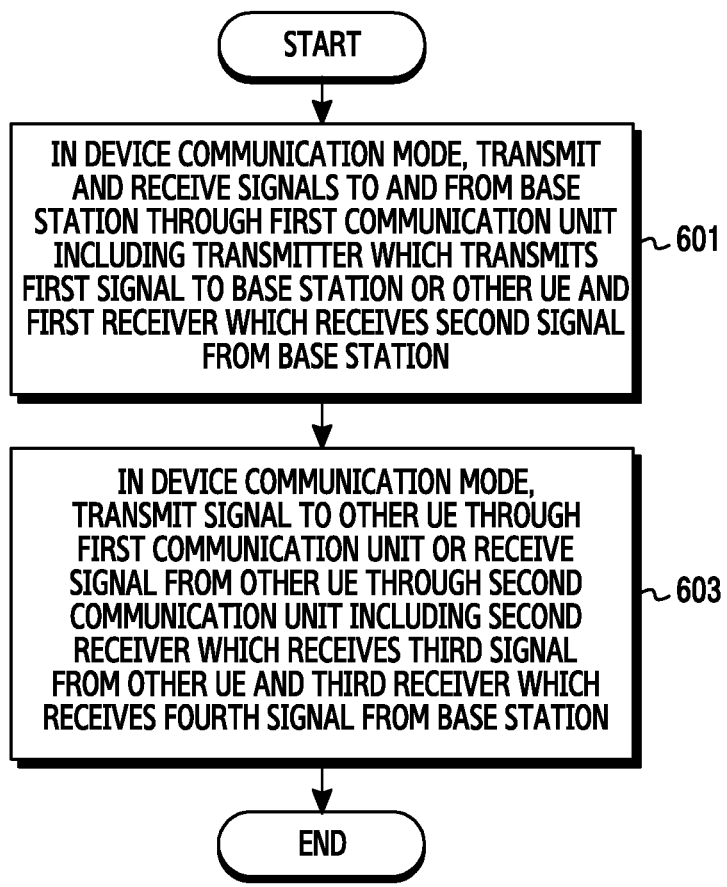
FIG. 6 is a flowchart of a method of a UE in a wireless communication system according to an embodiment of the present disclosure.

FIG. 6 is a flowchart of a method of a UE in a wireless communication system according to an embodiment of the present disclosure.

In step 601, the UE transmits and receives signals to and from a base station through the first communication unit including the transmitter 211 which transmits the first signal WAN TX to the base station in base station communication mode and transmits the first signal D2D TX to another UE in device communication mode and the first receiver 213 which receives the second signal WAN RX from the base station.

More specifically, in base station communication mode, the UE can transmit a first signal to the base station in the UL channel through the base station transmitter 311 of the transmitter 211. That is, the UE can transmit a first signal to the base station through the TX path 410 as shown in FIG. 4.

In step 603, in device communication mode, the UE can transmit a signal to another UE through the first communication unit 210 or receive a signal from another UE through the second communication unit 220 including the second receiver 221 which receives the third signal D2D RX from another UE and the third receiver 223 which receives the fourth signal WAN RX from the base station.

That is, in device communication mode, the UE can transmit a signal to another UE through the first communication unit 210. In device communication mode, the UE can receive a signal from another UE through the second communication unit 220. More specifically, in device communication mode, the UE can transmit a first signal to another UE in the UL channel through the device transmitter 312 of the transmitter 211, and receive a third signal from another UE in the UL channel through the device receiver 321 of the second receiver 221. That is, the UE can transmit a signal to another UE through the TX path 410 or receive a signal from another UE through the first D2D RX path 430 as shown in FIG. 4.

The UE may transmit a first signal to another UE in the UL channel only under the condition that base station communication mode is not conducted.

Figure 7:
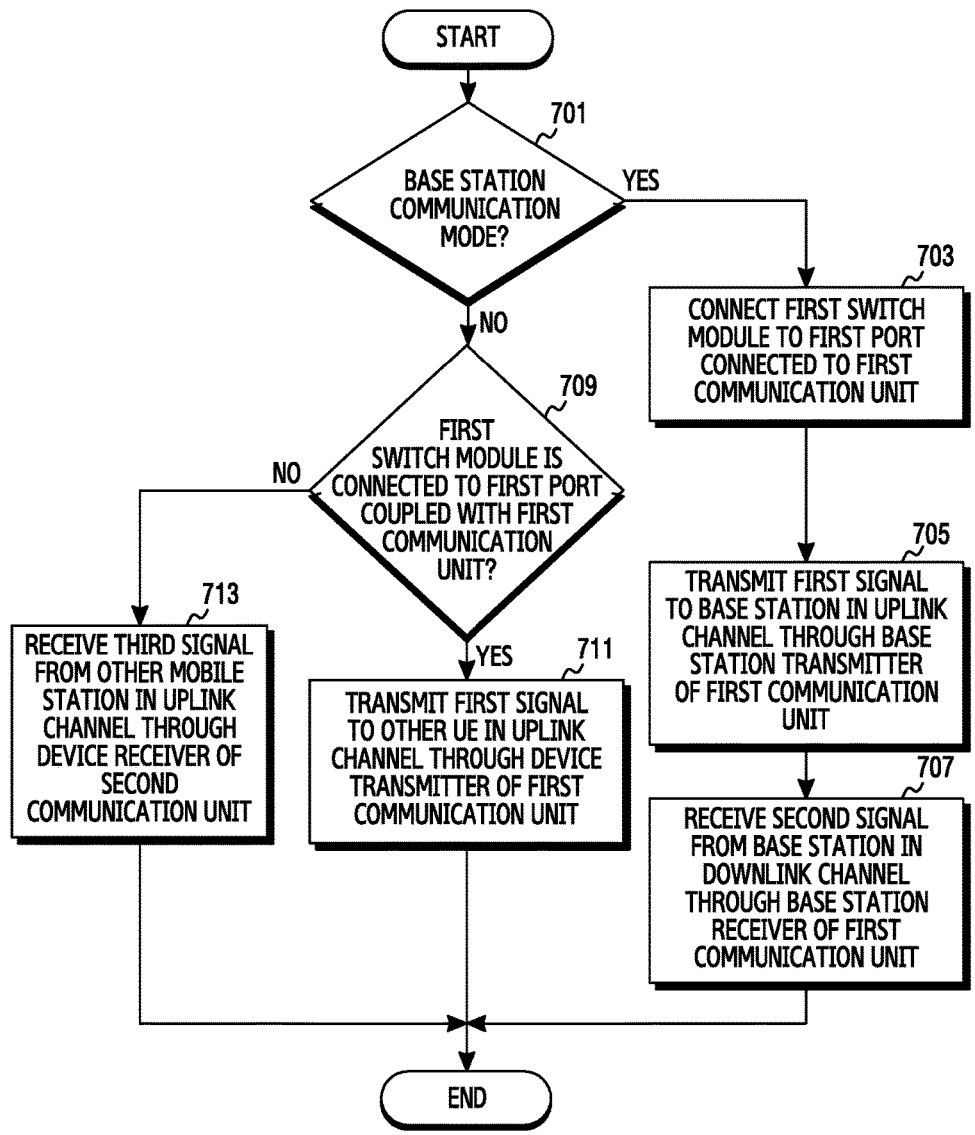
FIG. 7 is a flowchart of a method of a UE in a wireless communication system according to an embodiment of the present disclosure.

FIG. 7 is a flowchart of a method of a UE in a wireless communication system according to an embodiment of the present disclosure.

In step 701, the UE can determine whether it is in base station communication mode. Base station communication mode is a communication based on a base station and can indicate cellular communication mode. In base station communication mode in step 701, the first switch module 230 can be connected to the first port 240 connected to the first communication unit 210 in step 703.

In step 705, the UE can transmit a first signal WAN TX to a base station through the base station transmitter 311 of the first communication unit 210. That is, the UE can transmit a first signal WAN TX to a base station through the base station transmitter 311 of the first communication unit 210 in base station communication mode.

Particularly, when the UE is in base station communication mode, the second switch module 313 of the first communication unit 210 can be connected to the base station transmitter 311. In this case, a first signal output from the base station transmitter 311 can pass through the PA 314 and the UL BPF of the first BPF 315 and be transmitted to the base station.

In step 707, the UE can receive and forward a second signal WAN RX to the base station receiver 316 of the first communication unit 210. That is, the UE can receive the signal (e.g. DL signal) from a base station in base station communication mode and forward the received signal to the base station receiver 316 of the first communication unit 210. In particular, when the UE communicates in base station communication mode, the second switch module 313 of the first communication unit 210 can be connected to the first base station receiver 316. In this case, the signal received from the base station transmitter 311 can pass through the DL BPF of the first BPF 315 and the first LNA 317 and be output to the base station receiver 316.

In device communication mode in step 701, the UE can go to step 709. Device communication mode can indicate D2D communication mode.

In device communication mode, the UE can control the TDD switching of the first switch module 230. The first switch module 230 can be switched to the port 240 or the port 250. In step 709, the UE can determine whether the first switch module 230 is connected to the first port 240 connected to the first communication unit 210. The first switch module 230 can be connected to one of the first port 240 and the second port 250. In device communication mode, the first switch module 230 can TDD-switch between the first port 240 and the second port 250. When detecting the first switch module 230 connected to the first port 240 in step 709, the UE can transmit the first signal D2D TX through the device transmitter 312 of the first communication unit 210 in step 711. In the TX period of device communication mode, the first switch module 230 is connected to the device transmitter 312 and the first signal D2D TX output from the device transmitter 312 can be transmitted via the first switch module 230 and the antenna. The D2D transmission can be performed when cellular communication is conducted. This is because the frequency band of the D2D TX and RX signals uses the cellular UL band. As a result, the UL TX can terminate or drop the D2D TX.

When detecting the first switch module 230 connected to the second port 250 in step 709, the UE can conduct the D2D RX and the WAN RX in step 713. That is, the UE can receive the third signal D2D RX through the antenna and the second port 250 of the first switch module 230. When the first switch module 230 is connected to the second port 250 in device communication mode, the D2D RX signal from the other UE can be fed to the device receiver 321 through the UL BPF of the second BPF 323 and the second LNA 322.

In an embodiment of the present disclosure, a transceiver includes a first communication unit for transmitting a first signal to a base station or another UE and receiving a second signal from a base station, the first communication unit being connected to a first port, a second communication unit for receiving a third signal from another UE and receiving a fourth signal from a base station, the second communication unit being connected to a second port, a switch module for TDD-switching between the first port connected to the first communication unit and the second port connected to the second communication unit in a first communication mode.

The first signal is a cellular uplink TX signal and a D2D TX signal, the third signal is a D2D RX signal, the first signal and the third signal are cellular uplink band signals, and the first signal and the third signal are separated by the switch module.

As set forth above, the apparatus and method transmit or receive the signals in base station mode or device mode in the wireless communication system. Therefore, it is possible to reduce the TX or RX signal power loss or the TX or RX signal loss and to enhance the signal transmission/reception efficiency.

The present disclosure can be implemented using hardware, software, or a combination thereof.

In the case of software, a non-transitory computer-readable storage medium storing one or more programs (e.g. software modules) may be provided. One or more programs stored in the non-transitory computer-readable storage medium may be configured for execution by one or more processors of a server or the electronic apparatus. One or more programs include instructions for controlling the electronic apparatus to execute the methods according to an embodiment of the present disclosure.

Such a program (e.g., software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of those recording media. A plurality of memories may be provided.

The programs may be stored in an attachable storage device accessible via a communication network such as the Internet, an Intranet, a local area network (LAN), a wireless LAN (WLAN), a storage area network (SAN), or a communication network by combining these networks. The storage device can access the electronic apparatus through an external port. A separate storage device may access a portable electronic apparatus over a communication network.

While the present disclosure has been shown and described with reference to certain embodiments thereof, it will be understood by those skilled in the art that various changes in form and details may be made therein without departing from the scope and spirit of the present disclosure as defined by the appended claims and their equivalents.

What is claimed is:

1. An apparatus of a user equipment (UE) in a wireless communication system, comprising:
   a first communication unit comprising a transmitter configured to transmit a first signal to a base station or another UE and a first receiver configured to receive a second signal from the base station, wherein the first communication unit is connected to a first port of a switch module;
   a second communication unit comprising a second receiver configured to receive a third signal from the another UE and a third receiver configured to receive a fourth signal from the base station, wherein the second communication unit is connected to a second port of the switch module;
   wherein the switch module is configured to perform time division duplexing switching between the first port and the second port in a first communication mode, and wherein the switch module is connected to the first port in a second communication mode,
   wherein a bandpass filter of the first communication unit is connected to the first port of the switch module, and
   wherein another bandpass filter of the second communication unit is connected to the second port of the switch module.

2. The apparatus of claim 1, wherein the first signal is a cellular uplink transmission (TX) signal and a device to device (D2D) TX signal,
   the third signal is a D2D reception (RX) signal,
   the first signal is a cellular uplink band signal, and
   the first signal and the third signal are separated by the switch module.

3. The apparatus of claim 2, wherein the first communication unit further comprises:
   a device transmitter configured to generate the D2D TX signal;
   a base station transmitter configured to generate the cellular uplink TX signal;
   a first base station receiver configured to process a cellular downlink RX signal; and
   a first bandpass filter (BPF) configured to filter and apply TX signals of a cellular uplink band to the first port of the switch module, and filter and apply RX signals of a cellular downlink band output from the first port of the switch module, to the first base station receiver.

4. The apparatus of claim 3, wherein the second communication unit further comprises:
   a device receiver configured to process the D2D RX signal;
   a second base station receiver configured to process the cellular downlink RX signal; and
   a second BPF configured to filter and apply a D2D RX signal of the cellular uplink band output from the second port of the switch module, to the device receiver, and filter and apply an RX signal of the cellular downlink band output from the second port of the switch module, to the second base station receiver.

5. The apparatus of claim 4, wherein the switch module is further configured to connect an antenna to the first port in the second communication mode, and the first communication unit is configured to transmit the cellular uplink TX signal and processes the received cellular downlink RX signal through the first BPF.

6. The apparatus of claim 4, wherein the switch module is further configured to switch and connect to the first port and the second port in a preset TX period and a preset RX period in the first communication mode, the first communication unit is configured to apply the D2D TX signal to the first port of the switch module in the TX period, and the second communication unit is configured to process the D2D RX signal applied to the second port of the switch module in the RX period.

7. A method of operating a user equipment (UE) in a wireless communication system, comprising:

transmitting and receiving signals to and from a base station through a first communication unit including a transmitter which transmits a first signal to the base station or another UE and a first receiver which receives a second signal from the base station, wherein the first communication unit is connected to a first port of a switch module; and receiving a signal from the another UE through a second communication unit including a second receiver which receives a third signal from the another UE and a third receiver which receives a fourth signal from the base station, wherein the second communication unit is connected to a second port of the switch module, wherein the switch module is configured to perform time division duplexing switching between the first port and the second port in a first communication mode, wherein the switch module is connected to the first port in a second communication mode, wherein a bandpass filter of the first communication unit is connected to the first port of the switch module, and wherein another bandpass filter of the second communication unit is connected to the second port of the switch module.

8. The method of claim 7, wherein the first signal is a cellular uplink transmission (TX) signal and a device to device (D2D) TX signal, the third signal is a D2D reception (RX) signal, the first signal is a cellular uplink band signal, and the first signal and the third signal are separated by the switch module.

9. The method of claim 8, wherein transmitting and receiving signals, in the second communication mode, to and from the base station comprises:

transmitting the cellular uplink TX signal, in the second communication mode, to the base station through a base station transmitter of the first communication unit.

10. The method of claim 8, wherein transmitting and receiving signals, in the second communication mode, to and from the base station comprises:

receiving a cellular downlink RX signal, in the second communication mode, from the base station through a first base station receiver of the first communication unit.

11. The method of claim 8, wherein transmitting the signal, in the first communication mode, to the another UE through the first communication unit or receiving of the signal from the another UE through the second communication unit comprises:

transmitting a D2D TX signal, in the first communication mode, to the another UE in an uplink band through a device transmitter of the second communication unit.

12. The method of claim 8, wherein transmitting the first signal comprises:

transmitting a TX signal to the another UE in an uplink band only when the second communication mode is not performed.

13. A transceiver chip set, comprising a chip set configured to:

transmit and receive signals to and from a base station through a first communication unit including a transmitter which transmits a first signal to the base station or another UE and a first receiver which receives a second signal from the base station, wherein the first communication unit is connected to a first port of a switch module; and receive a signal from the another UE through a second communication unit including a second receiver which receives a third signal from the another UE and a third receiver which receives a fourth signal from the base station, wherein the second communication unit is connected to a second port of the switch module, wherein the switch module is configured to perform time division duplexing switching between the first port and the second port in a first communication mode, and wherein the switch module is connected to the first port in a second communication mode, wherein a bandpass filter of the first communication unit is connected to the first port of the switch module, and wherein another bandpass filter of the second communication unit is connected to the second port of the switch module.

14. The transceiver chip set of claim 13, wherein the first signal is a cellular uplink transmission (TX) signal and a device to device (D2D) TX signal, the third signal is a D2D reception (RX) signal, the first signal is a cellular uplink band signal, and the first signal and the third signal are separated by the switch module.

15. The transceiver chip set of claim 14, wherein transmitting and receiving signals, in the second communication mode, to and from the base station comprises:

transmitting the cellular uplink TX signal, in the second communication mode, to the base station through a base station transmitter of the first communication unit.

16. The transceiver chip set of claim 14, wherein transmitting and receiving signals, in the second communication mode, to and from the base station comprises:

receiving a cellular downlink RX signal, in the second communication mode, from the base station through a first base station receiver of the first communication unit.

17. The transceiver chip set of claim 14, wherein transmitting the signal, in the first communication mode, to the another UE through the first communication unit or receiving of the signal from the another UE through the second communication unit comprises:

transmitting a D2D TX signal, in the first communication mode, to the another UE in an uplink band through a device transmitter of the second communication unit.

18. The transceiver chip set of claim 14, wherein a bandpass filter of the first communication unit is connected to the first port of the switch module, and wherein a bandpass filter of the second communication unit is connected to the second port of the switch module.

* * * * *